United States Patent [19]

Thomas et al.

[11] 4,155,096
[45] May 15, 1979

[54] AUTOMATIC LASER BORESIGHTING

[75] Inventors: Frank J. Thomas; John G. Beauregard, both of Orlando, Fla.

[73] Assignee: Martin Marietta Corporation, Orlando, Fla.

[21] Appl. No.: 872,196

[22] Filed: Jan. 25, 1978

Related U.S. Application Data

[63] Continuation of Ser. No. 780,200, Mar. 22, 1977, abandoned.

[51] Int. Cl.² ............................................. H04N 7/18
[52] U.S. Cl. ..................................... 358/125; 33/286; 244/3.13; 244/3.16; 250/203 CT; 250/215; 356/152; 356/153
[58] Field of Search ............... 358/125, 126; 244/3.13, 244/3.16; 250/203 CT, 215; 356/141, 152, 153; 33/286

[56] References Cited

U.S. PATENT DOCUMENTS

| 3,699,380 | 10/1972 | Alpers | 358/126 |
| 3,752,587 | 8/1973 | Myers | 356/153 |
| 3,923,273 | 12/1975 | Alpers | 358/125 |
| 3,942,894 | 3/1976 | Maier | 356/153 |

Primary Examiner—Howard W. Britton
Attorney, Agent, or Firm—Julian C. Renfro; Gay Chin

[57] ABSTRACT

To boresight the laser of a laser designator system to the null point of an automatic television tracker, by selectively causing the laser beam to be retroreflected to the video sensor of the system, which interfaces with a television tracker. The tracker locks onto the retroreflected laser spot, with the tracker error signals, in a feedback control loop, being used to control the video sensor raster bias to center the sensor sweeps about the laser spot, thereby nulling the tracker error signals and achieving boresight with the laser automatically.

18 Claims, 7 Drawing Figures

AUTOMATIC LASER BORESIGHTING

This is a continuation of U.S. Pat. application Ser. No. 780,200 filed Mar. 22, 1977, now abandoned.

BACKGROUND OF THE INVENTION

The invention is in the field of laser designators used in accordance with laser guided weapon delivery systems of laser countermeasure systems, and particularly relates to a technique for boresighting a laser beam to the video sensor of the laser designator system.

Modern weapon delivery systems strive to establish a high probability of first pass target destruction by attack aircraft. Performance requirements are especially acute in aircraft mounted laser designator system applications, which typically are incorporated in a pod configuration, and in such an embodiment, required system pointing accuracies are on the order of tenths of a milliradian. Automatic television tracker systems including television point trackers or area correlation trackers operating with compatible sensors such as vidicons, have been found to be capable of meeting these performancy requirements. The tracker measures the alignment error between the line of sight to the target and the optical system pointing vector and issues error signals which command the system servos to correct the system pointing vector to achieve the desired result.

For a truly effective fire control system, the laser beam to be directed at the distant target must be boresighted to the television tracker system. Prior boresighting systems include those which sighted the laser designator pod apart from the aircraft such as during initial assembly only, or at scheduled intervals in a maintenance shop. Other systems permit boresighting while the laser pod is installed on the aircraft. However, these prior art systems are limited to occasional boresighting on laser secure ranges or to flight line boresighting to each mission. The type of system which would allow for the smallest boresight error over many missions is the type which is based upon airborne boresighting. Airborne boresighting techniques may involve the alignment of the laser optical axis only once at the beginning of the mission in response to a pilot initiated command, or boresighting may be initiated each time the fire control system is activated.

Examples of known laser boresighting techniques are given in U.S. Pat. No. 3,628,868 issued Dec. 21, 1971 to Starkey and U.S. Pat. No. 3,752,587 issued Aug. 14, 1973 to Meyers et al. Starkey shows a laser boresight device which has a telescope mounted on the housing of the laser and accomplishes boresighting through manual micrometer adjustments. Meyers discloses a boresighting device which utilizes a strip of material to which the laser is directed during the boresighting operation. The laser will burn a hole through the strip allowing light to pass therethrough to the television sensor. The image thus created is aligned on the television camera through the manual adjustment of the horizontal and vertical potentiometers, which position the image with respect to optical crosshairs. Neither of these references disclose automatic boresighting, and this fact is quite significant when it is realized that the pilot is preoccupied with aircraft flight tasks, and in such circumstances cannot perform manual laser boresighting accurately and reliably.

SUMMARY OF THE INVENTION

A laser designator system utilizing our novel autoboresighting arrangement includes a laser source, an imaging subsystem utilizing a sensor having a raster and a photosensitive surface, a tracker, typically a point tracker, connected to receive video information from the sensor and serving to generate error signals, and optical components defining one or more optical paths. This system includes an arrangement of optical components that serve to direct an output beam of energy from the laser source through an outlet port, as well as optical components serving to direct scene radiance entering through the outlet port, such that a portion of the incoming radiance falls upon the photosensitive surface of the sensor.

Means are provided for selectively controlling at least one optical component so as to cause, when boresighting is to be brought about, a redirection of the laser energy along an optical path such that a part of such energy falls upon the photosensitive surface of the sensor. A feedback loop is provided between the laser source and the sensor, in which the point tracker interconnected with the sensor is utilized during boresighting to sense and measure the misalignment between the output of the laser source, and the center of the operating field of view of the sensor, with a novel error processor being used for converting error signals from the point tracker representative of the misalignment, into alignment signals directly usable in the adjusting of the sensor, preferably electronically, so as to boresight its operating field of view with the output from the laser source. This is accomplished in accordance with a preferred embodiment by using means sensitive to misalignment to create bias modification signals for delivery to the sensor in such a way as to bring the center of the raster into coincidence with the laser output beam.

Advantageously, our automatic boresight arrangement may be used most effectively with the hardware of many existing laser designator systems, and only small changes are necessitated in order that a fully automatic boresighting procedure in accordance with this invention may be carried out in such systems.

It is therefore a primary object of our invention to accurately and automatically accomplish the boresighting of a laser, such as the kind used in an aircraft-mounted laser designator pod, with the null point of the device used to perform the target tracking functions, by appropriately biasing the raster of the TV camera forming a part of the imaging subsystem, so as to null out aiming errors.

It is another object of our invention to provide a laser designator pod in which it is possible for the pilot of a single seat aircraft to accomplish needed boresighting of the TV camera with the laser beam, without causing the pilot to occasionally neglect his numerous other obligations, as was previously necessary for him to do in order to pursue prior art boresighting techniques.

It is still another object of our invention to provide an automatic boresighting function for a laser designator, such as used in a laser designator pod, which serves to minimize the possibility of human error, such that accuracy of the laser designation will be greatly increased while at the same time decreasing the workload of the pilot.

It is yet another object of our invention to provide an autoboresighting function making the fullest use of existing optical and electronic components, and necessitating the inclusion of the smallest possible number of additional components in providing an arrangement making possible a fully automatic and highly effective laser boresight capability.

It is yet still another object of our invention to greatly increase the accuracy of a laser designator system by providing a low cost, accurately operating arrangement whereby the means for providing a target tracking function is automatically boresighted to the laser being used for designating the targets at which laser weapons, including laser guided missiles, are to be directed.

It is still another object of our invention to accomplish automatic boresighting of the imaging subsystem of a laser designator system by modifying in a minor way, the sweep circuits of such imaging subsystem, and thus making it possible to selectively control the raster scan position within the sensor used by the imaging subsystem in such a way as to bring the center of the raster into coincidence with the laser output beam.

These and other objects, features and advantages of this invention will be more apparent as the description proceeds.

DRAWING DESCRIPTION

DETAILED DESCRIPTION

Figure 1:
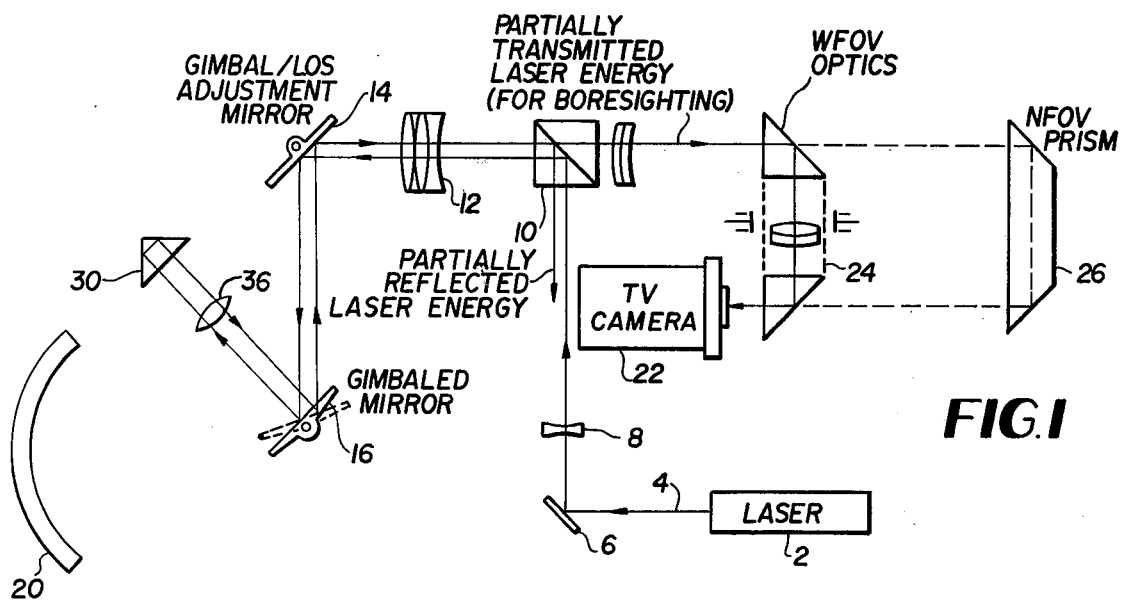
FIG. 1 is a diagrammatic representation of the principal components of a laser designator system modified in accordance with our invention, this view revealing the approximate operating relationships of the optical, laser and imaging subsystems within such a system.

Turning to FIG. 1, this diagrammatic representation of the principal components of a laser designator system having autoboresighting capabilities reveals the approximate operating relationships of the optical, laser and imaging subsystems within such a system. The illustrated arrangement includes the use of a laser 2 used for designating a target at which laser weapons can thereafter be directed, and as is obvious, the laser utilized in a selected instance should be chosen from those available lasers operating at a wavelength and pulse repetition rate most suitable for its intended target designating purpose.

Figure 2:
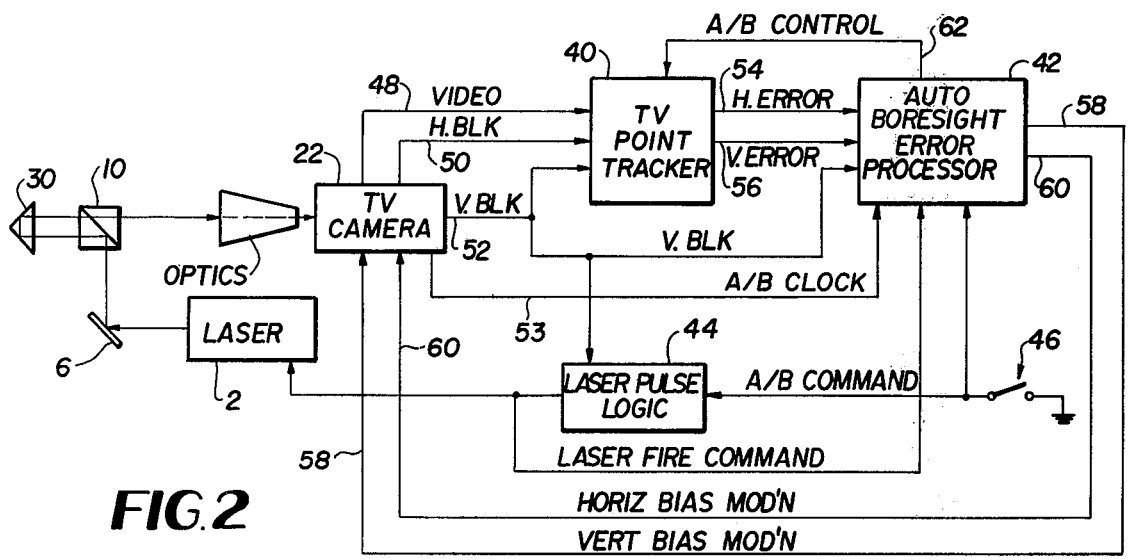
FIG. 2 is a functional block diagram depicting the principal components involved in a laser designator system that has been modified to utilize the automatic boresighting arrangement in accordance with this invention.

Also depicted in FIG. 1 is an imaging subsystem, which in this embodiment includes a TV camera 22 to be used for providing the pilot or other operator with a visual display of the target scene, and for providing the tracker, typically a TV point tracker as shown in FIG. 2, with the video necessary in order for it to perform an automatic tracking function. The TV camera typically uses a vidicon as its sensor, but as is obvious, operational constraints of the pod may be such as to warrant the use of a FLIR sensor. Quite importantly, we utilize, in accordance with this invention, the TV camera 22 as the positional control element which enables our novel automatic boresight methodology to be implemented.

As will be understood, optical systems of long focal length are required in order to magnify a target to a sufficient extent as will make long standoff ranges possible, and in accordance with conventional practice, folded optical paths are used. Thus, in FIG. 1, when this device is operating in a target designating mode, the laser output beam 4 is directed upon a mirror 6 that serves to redirect the laser energy through a laser designator telescope comprising lens 8, dichroic prism 10 and lens 12. The laser beam 4 then continues its path to the gimbal/line of sight adjustment mirror 14, with the mirror 16 thereafter serving to direct the laser beam outwardly through the dome 20, which of course serves as the outlet port for the laser energy.

Light radiated from the target scene and entering through the dome 20 is directed by the mirror 16 onto the mirror 14, and thereafter through the lens 12 onto the dichroic prism 10. Most of the energy will be transmitted by the dichroic prism, which then passes through either the wide field of view (WFOV) prism 24 or the narrow field of view (NFOV) prism 26. This light then falls upon the sensitive surface or faceplate of the sensor 22.

We mount the mirror 16 on gimbals, so that it can be selectively moved by the designator system servo electronics between the full line and the dashed line positions shown in FIG. 1. When in the full line position, the mirror 16 serves to direct energy from the laser 2 outwardly through the dome, and to direct the scene information passing through the dome 20 onto the faceplate of the sensor utilized by the TV camera 22. It is to be understood when the tracker 40 of FIG. 2 is tracking a target, it closes a servo loop through mirror 16, such that the line of sight of the pod follows the line of sight to the target.

When, however, the autoboresight procedure in accordance with this invention is to be carried out, the mirror 16 is automatically moved to the dashed line position, in which position it directs energy from laser 2 onto the corner reflector 30 provided with this invention. The retroreflected laser beam 4 strikes the mirror 16, then the gimbal/line of sight mirror 14, and then continues its travels through the lens 12 to the dichroic prism 10, which permits a small portion of the laser beam 4 to be transmitted through the wide field of view or the narrow field of view optics to the TV camera 22. If necessary, initiation of the boresight sequence can also trigger the covering of the dome 20 with a mechanized dome cover (not shown) to minimize external laser emission, and if desired, an optical element 36 may be employed between the gimballed mirror 16 and the corner cube 30 in order to decollimate the retroreflected laser beam to some extent, thus to assist the tracker in locking onto the laser spot focused on the sensor faceplate.

Turning now to the functional block diagram of FIG. 2, wherein significant electronic subsystems pertinent to our novel autoboresight system are revealed, it will be noted that like elements in FIGS. 1 and 2 carry common numerical designators. Depicted in FIG. 2 are conventional componenets such as the TV camera 22, the television point tracker 40, and a switch 46, as well as our novel autoboresight error processor 42 and the laser pulse logic 44. It is to be understood that in this exemplary embodiment, the vidicon of the TV camera serves as the sensor of the imaging subsystem we use.

It is to be noted that line 48 carries video from the TV camera to the point tracker 40, while the lines 50 and 52 carry the horizontal and vertical blanking signals to the tracker. Line 53 carries the autoboresight clock to the autoboresight error processor 42 provided in accordance with this invention, with the clock being sychronously derived in a well known manner from the TV camera sync generator. The vertical blanking signal is also delivered to the error processor 42 and the laser pulse logic 44.

The point tracker 40 is a device well known to those skilled in this art, and it serves to create a tracking window symmetrically about a target chosen by the operator. An example of a point tracker usable herein with only some modification is shown in Crawford U.S. Pat. No. 3,725,576, but we obviously are not to be limited thereto.

The selected tracker 40 serves to provide a horizontal error signal on lead 54, and a vertical error signal on lead 56, which are connected to our novel autoboresight error processor 42.

Our autoboresight error processor 42 functions in a manner described more fully hereinafter, to respectively provide on output lines 58 and 60, vertical and horizontal sweep bias modification signals. These signals are to be used in accordance with this invention to modify the position of the raster scan pattern of the TV camera 22 in such a way as to cause the autoboresighting function to be properly performed.

As is known, the conventional frame rate of a TV camera is 30 frames per second, which to some degree would be incompatible with the pulse rate of the laser 2 used in this exemplary embodiment, which may be 10 pulses per second. Accordingly, we control the sample processing rate of the TV point tracker 40 such that it does not drift during laser pulse intervals. This control of the sample processing is accomplished by implementing our autoboresight error processor 42 in such a way as to provide an autoboresight control signal on lead 62, which serves to bring about control of the sample rate of the tracker 40 in a manner easily understood by those skilled in this art. This is to say, although the TV point tracker 40 may normally operate at a sample rate controlled by the TV frame rate, in accordance with this invention we enable the TV tracker, during the autoboresighting procedure, to operate in a manner consistent with the data rate of the laster 2, which in this instance occurs at the laser pulse rate.

Figure 3:
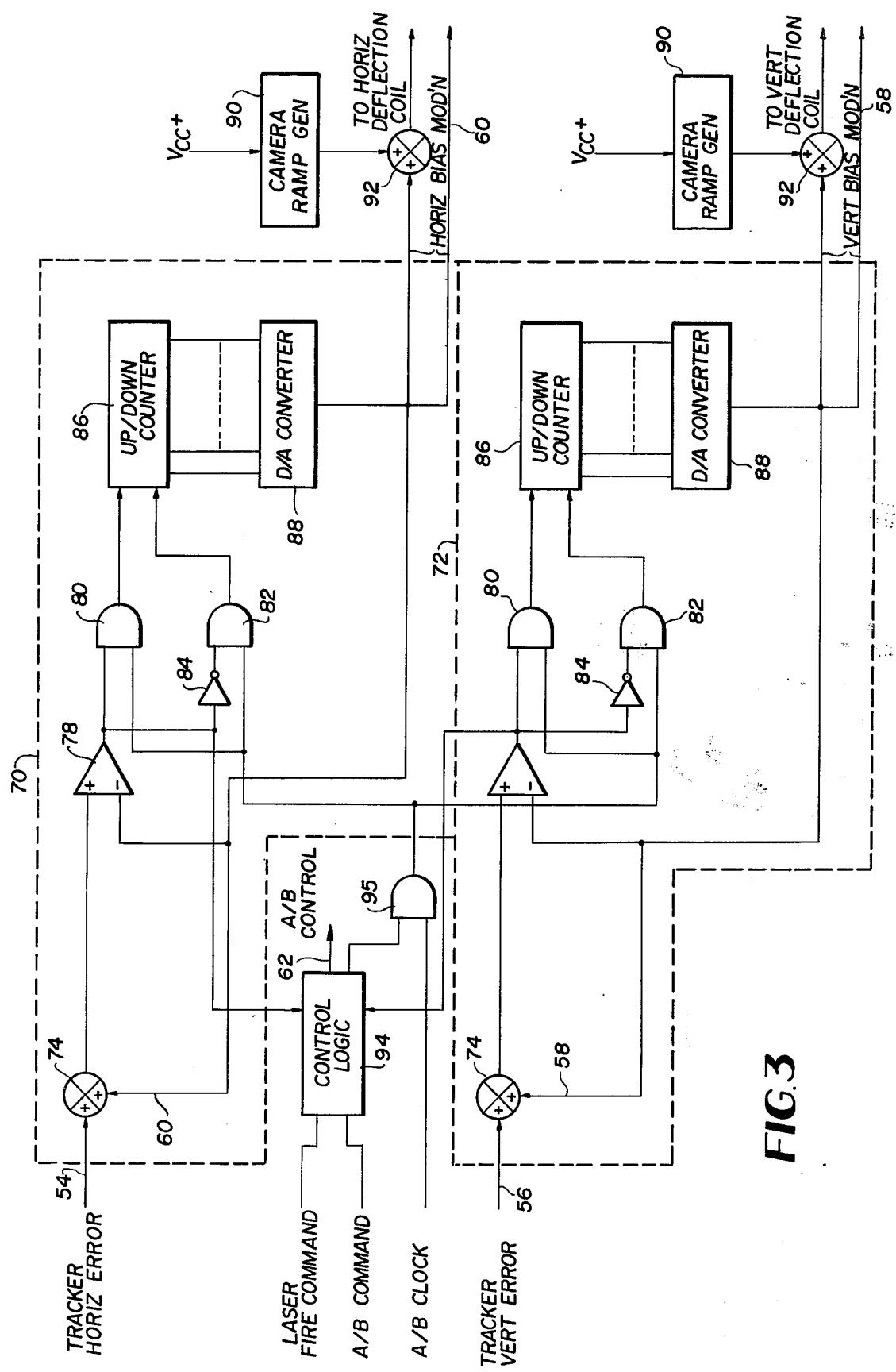
FIG. 3 is a diagrammatic representation of the principal components of the autoboresight error processor in accordance with this invention.

FIG. 3 is a functional block diagram of our novel autoboresight error processor 42. The circuitry within block 70 is utilized for generating the horizontal sweep bias modification signal, and the circuitry in block 72 is utilized for generating the vertical sweep bias modification signal. Inasmuch as the horizontal and vertical circuits of the autoboresight error processor are substantially identical, it is only necessary to describe one of these circuits. Therefore, in order to further the understanding of this important part of our invention, the horizontal portion 70 of the autoboresight error processor will now be described in some detail.

Figure 4A:
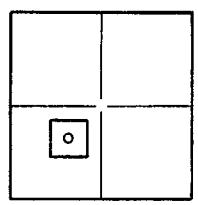
FIG. 4A illustrates the video display of the TV camera in an instance in which an undesirable offset exists between the laser designator and the center of the TV camera field of view.
Figure 4B:
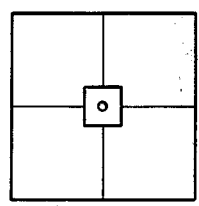
FIG. 4B illustrates the video display of the TV camera after boresighting has been accomplished.

The tracker horizontal error signal on lead 54 and the tracker vertical error signal on lead 56 are created as a result of a misalignment of the target with respect to the center of the field of view of the TV camera 22. FIG. 4A is illustrative of misalignment between the center of the TV field of view, and the laser beam, with it being understood that the laser beam is visible in the field of view only during the boresighting procedure. The tracker serves to position a tracking window symmetrically around the laser spot during the boresighting, procedure. The tracker generates error voltages on lines 54 and 56 proportional to the displacement between the center of the tracking window, and the center of the TV field of view. These signals on lines 54 and 56 are processed by the autoboresight error processor 42 in order to generate raster bias voltage on lines 58 and 60 for the TV camera. Although this function will be discussed at greater length hereinafter, it should suffice at this point to say that latter voltages cause the TV camera raster to move in a direction so as to center the tracking window in the center of the TV field of view, as shown in FIG. 4B. When this centering has been accomplished, the error voltages on lines 54 and 56 will be nulled, and the respositioning of the raster within the sensor will cease. The raster will not be maintained in the new location by storing the raster bias signals in a digital counter, causing constant outputs of the bias modification signals on leads 58 and 60. At this point, the autoboresighting has been accomplished.

It is to be noted that the vertical and horizontal sweep bias modification signals on leads 58 and 60 could alternatively be used with electromechanical means serving to physically alter the position of the vidicon so as to align the photosensitive surface of the vidicon with the laser beam, but such an arrangement is not preferred in view of the added complexity and cost.

As revealed in FIG. 3, the tracker horizontal error signal is applied as one input to the summer 74, and the horizontal sweep bias modification signal, generated in accordance with this invention in a manner to be hereinafter described, is applied by means of lead 60 to the other input to the summer 74. This latter device is a conventional analog summing amplifier, such as an operational amplifier. The sum signal resulting from the action of the summer 74 is applied to an up/down counter 86 in a manner to be described hereinafter. Inasmuch as the derivation of the horizontal sweep bias modification signal is most important to a proper understanding of this invention, such derivation will shortly be described in detail. It is noted that the horizontal sweep bias modification signal on line 60 at the initiation of a boresight sequence is that signal which appeared on this line at the end of the preceding autoboresight sequence (or at startup), and which was stored in the autoboresight error processor storage means between autoboresight sequences. In the preferred embodiment, the bias modification error signal storage means includes the counter 86 of FIG. 3.

The output from summer 74 appears at the arithmetical sum of the tracker horizontal error signal and the horizontal sweep bias modification signal. This sum signal is applied to the positive input of the comparator 78. The negative input to comparator 78 is the horizontal sweep bias modification signal. This sum signal is applied to the positive input of the comparator 78. The negative input to comparator 78 is the horizontal sweep bias modification signal on line 60. Coincidence gates 80 and 82 receive the output from the comparator 78, with gate 82 receiving the comparator 78 output through the inverter 84. The outputs of gates 80 and 82 are applied to the up/down counter 86 which serves to accumulate and hold a digital word representative of the degree of misalignment of the target data and the center of the field of view of the TV camera. The enabling inputs to the gates 80 and 82 are derived from the output of coincidence gate 95, the inputs to gate 95 being the autoboresight clock signal 53 from the TV camera 22 and an output from control logic 94. The control logic 94 will later be discussed in conjunction with FIG. 5A.

FIG. 4A, as discussed hereinabove, illustrates a view of the pilot's TV monitor in an instance in which an undesirable offset exists between the laser designator and the center of the TV camera field of view, such as may be the case upon initially powering up the system. In this illustration, the television point tracker window has locked onto the laser spot, which appears in this instance in the third quadrant. FIG. 4B of course represents the monitor after the autoboresight loop has so positioned the TV raster than the center of the raster is coincident with the retroreflected laser spot.

Under the conditions shown in FIG. 4A, tracker error signals will be generated within the tracker which indicate to the autoboresight error processor 42 the amount by which the horizontal and vertical sweep bias modification signals must be altered in order to achieve boresight. As viewed in FIG. 3, when the summation signal on output line 160 from summer 74 is greater than the value at summer 74 of the horizontal sweep bias modification signal on line 60, the output of the comparator 78 achieves a logic high which, in the presence of an enabling signal from the output of coincidence gate 95, causes the counter 86 to begin increasing its stored count.

On the other hand, if the summation signal on line 160 is less than the stored horizontal sweep bias modification signal, the output of the comparator 78 will be a logic low, which logic low is applied to the coincidence gate 82 as a logic high through the operation of inverter 84. When the gate 82 is enabled, the counter 86 is caused to count down.

When the error signal is nulled by action of the positive input to comparator 78 equaling the negative input thereto, the control logic is commanded to inhibit coincidence gate 95 and thereby stop the counter 86 from counting. The count in the counter 86 then represents the proper horizontal sweep bias modification signal.

The digital count in up/down counter 86 is converted in a well known manner into an analog signal through the operation of the digital-to-analog converter 88 in order to produce the horizontal bias modification signal. This signal is added in summer 92 to the signal from the camera ramp generator 90 to produce the horizontal deflection coil drive signal shown at the summer output. This latter signal is utilized to adjust the TV camera raster position, thus accomplishing horizontal boresighting. This result is illustrated in FIG. 4B, where the horizontal error depicted in FIG. 4A has been nulled.

Inasmuch as it has been previously explained that the vertical boresighting circuitry is substantially identical to the horizontal boresighting circuitry, it is believed unnecessary to explain the vertical boresighting procedure in any degree of detail.

Returning briefly to FIG. 2, initiated is to be understood that the autoboresight sequence is initited upon the closing of the autoboresight command switch 46. It is immaterial insofar as our invention is concerned whether the switch 46 is manually operated by the pilot, or activated by mode control logic electronics such that the sequence is initiated automatically. In this latter instance, appropriate delay circuitry is provided in order to inhibit other pod operating modes until such time as the boresight sequence has been completed.

If the boresight sequence is initiated each time the acquisition mode is selected, boresighting is advantageously accomplished just prior to the commencement of target designation. In the system of the present invention, the boresighting sequence takes approximately 15 seconds, but this is function of system design, and the time involved is principally determined by the electromechanical subsystem components.

It is to be appreciated that in accordance this invention we have provided an automatic boresighting capability that may be carried out with minimum additional system components, with minimum pilot involvement, and with the boresighting being able to be pursued whether the system is making use at a given moment of the wide field of view (WFOX) or the narrow field of view (NFOV) optics.

Normally the NFOV optics would be utilized during the autoboresight sequence since the most severe accuracy requirements are normally required while using the NFOV. To permit use of the NFOV optics, the WFOV optics 24 is moved in a manner appropriate to displace the two prisms shown in FIG. 1 out of the light path, allowing light to be directed to the NFOV prism 26, and thence on to the TV camera 22. The specific design of the WFOV mounting arrangement is not of particular consequence, and the prisms can be moved rotationally or in translation.

It is a common characteristic of multi FOV imaging systems, such as the one described herein, that the field of view be aligned with each other such that the image of a point at the center of the FOV does not appear to displace as the optics are switched from one FOV to another. Inherent to this invention is the fact that the alignment between fields of view can be quickly and accurately checked. First, the normal autoboresight sequence is completed in the NFOV, after which the WFOV optics are rotated back to the operative position. The autoboresight sequence is then performed again, except the tracker error voltages 54 and 56 are inhibited from moving the TV camera raster but are, instead, measured and recorded. using the appropriate tracker scale factor, the misalignment between the NFOV and the WFOV can be quickly and accurately determined using these two voltage measurements. If a consequential error is found, realignment is accomplished by changing the appropriate optical path, such as by prism realignment.

The magnitude of the laser energy from a laser designator can be greatly reduced or even go to zero due to deteriorating or failing components within the laser 2. As a consequence of using this invention, a gross indication of the magnitude of the laser energy can be quickly established by simply observing the intensity of the laser spot on a TV monitor connected to display the TV camera video during the autoboresight sequence. A significantly more accurate laser energy indication can be obtained when the peak TV camera vidicon output current is measured during the autoboresight sequence.

Figure 5A:
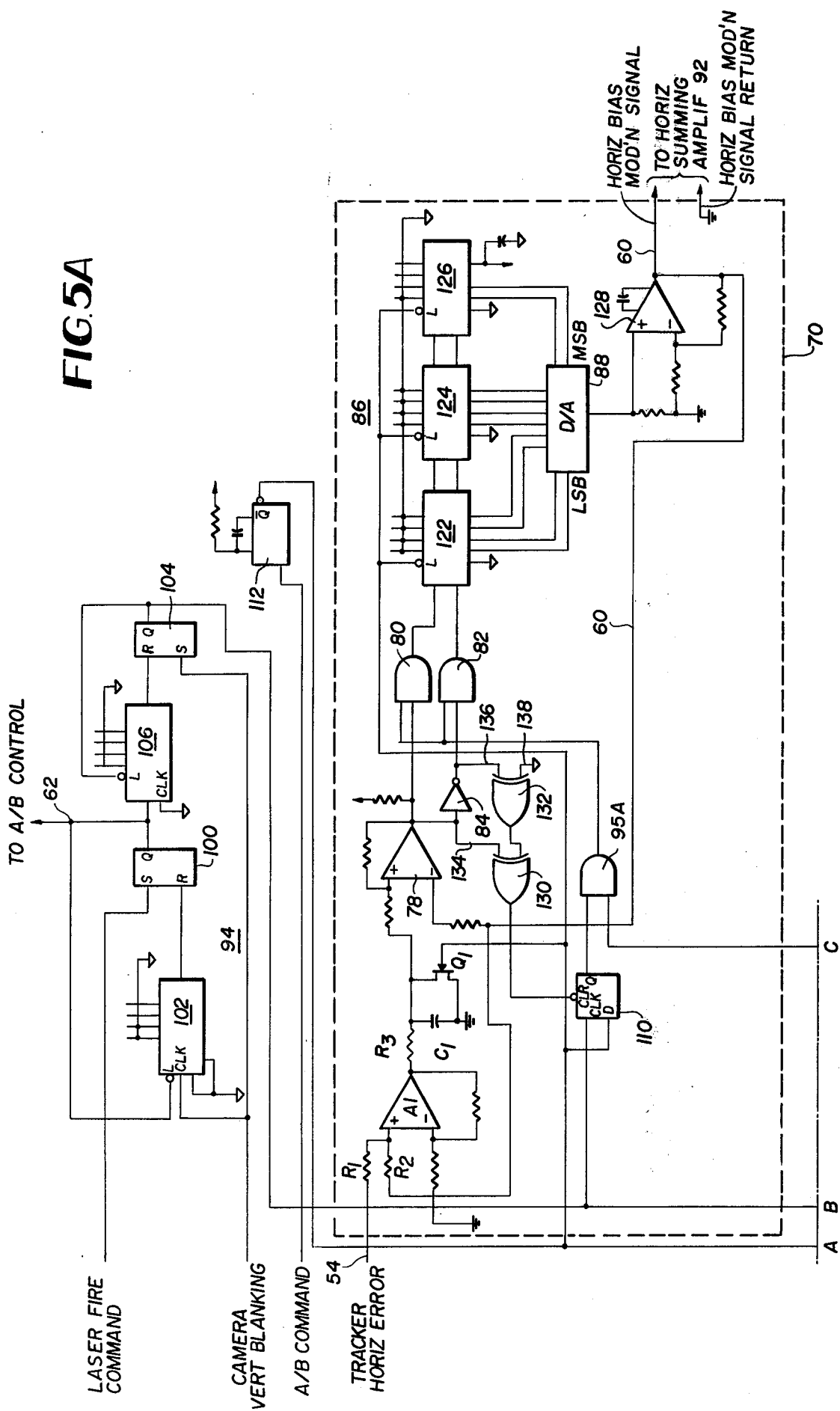
FIG. 5A is a schematic of the autoboresight control logic and the portion of the autoboresight error processor concerned with generation of the horizontal bias modification signal.
Figure 5B:
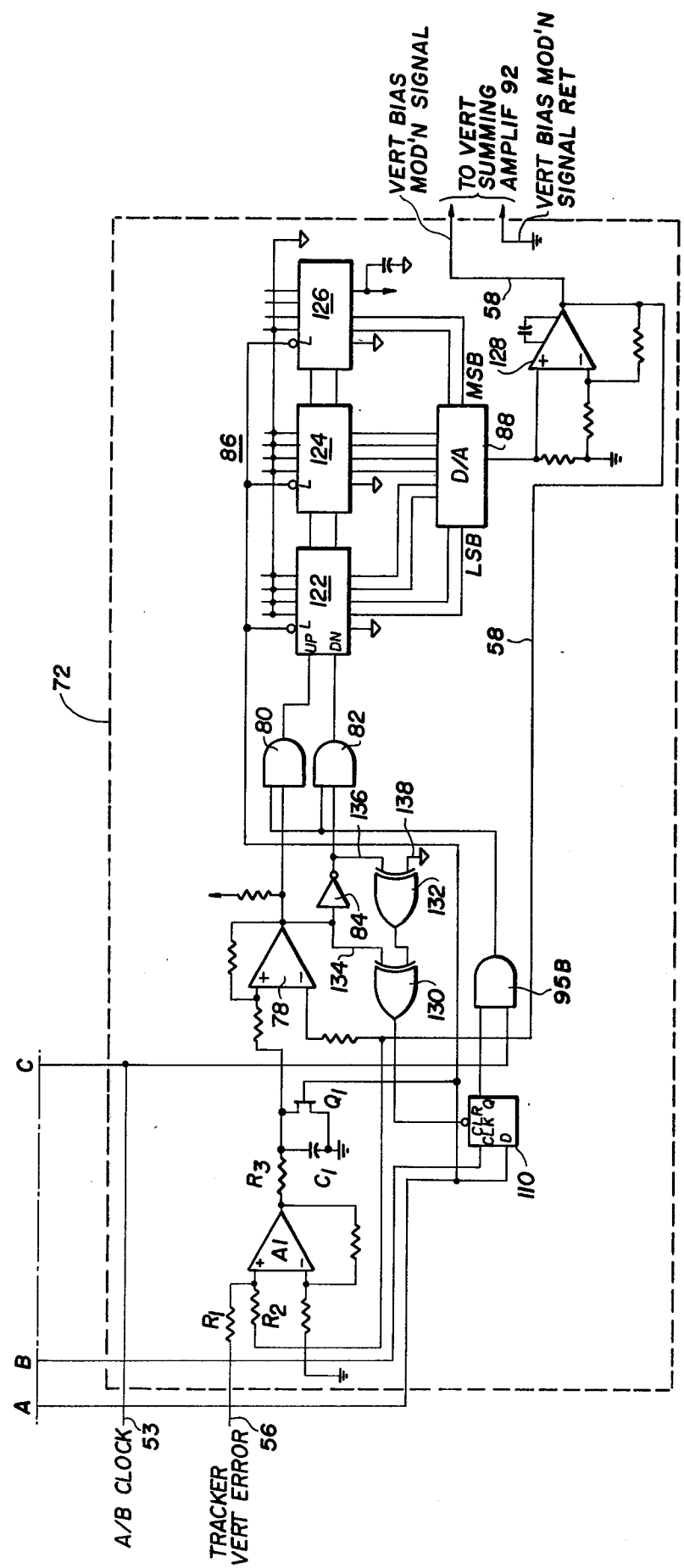
FIG. 5B is a schematic of the portion of the autoboresight error processor concerned with the generation of the vertical bias modification signal.

FIGS. 5A and 5B represent respective schematic diagrams of the horizontal portion, and the vertical portion, of the autoboresight error processor described in conjunction with FIG. 3. As will be noted, the leads at the lower left of FIG. 5A have been designed to interconnect with the leads at the upper right of FIG. 5B, so that when these figures have been placed in juxtaposition, a proper showing of the entire autoboresight error processor is made.

Control logic 94 provides control and synchronization functions. It synchronizes the laser fire command pulses to the vertical blanking signals, provides the autoboresight control signal to the television point tracker thereby alerting the tracker to look for laser rate, e.g., 10 pps targets, and provides a delay function to give the television point tracker time to settle into the boresight mode of operation. The autoboresight control signal to the tracker is required in that the tracker operates at a 30 pps frame rate. The autoboresight control signal insures that the tracker will lock onto, for example, a 10 pps target and not reject such signals as spurious.

The control logic 94 of FIG. 3 may be seen in FIG. 5A to comprise programmable counters 102, 106 and flipflops 100, 104, and 110, multivibrator 112 and exclusive OR gates 130 and 132. The vertical blanking pulses set flipflop 104, and this flipflop will be reset when counter 106 overflows. A vertical blanking signal following such overflow of counter 106 will again set the flipflop 104. When this flipflop sets in time coincidence with an autoboresight command signal applied via the monostable multivibrator 112 to the D-input of the flipflop 110 forming a part of the horizontal bias modification circuit 70 of FIG. 5A, and to the correspondong flipflop of the vertical bias modification circuit 72 of FIG. 5B, bias modification signals are generated. This aspect of our invention will be discussed at greater length hereinafter.

The loading of counter 106 of the control logic of FIG. 5A will now be explained. The laser fire command signals emanating from the laser pulse logic 44 of FIG. 2 are initiated at the beginning of the autoboresight sequence. These signals are applied to the set input of the flipflop 100. When flipflop 100 sets, the load input to the counter 102 is removed, allowing the vertical blanking signals, applied to the counter clock input, to step the counter. Counter 102 is programmed to overflow at a count of 3. When counter 102 overflows, flipflop 100 is reset so that the following laser fire command pulse will again set the flipflop. Thus, counter 102 and flipflop 100 operate as a control circuit providing an A/B control pulse to the tracker on every third TV field. With flipflop 104 set, the load is removed from counter 106 to allow this counter to step. Counter 106 counts the number of times the flipflop 100 is set. The count at which counter 106 overflows is selected from experience to provide a time delay sufficient to give the television point tracker time to acquire the laser spot and to reach a quiescent state after it is activated into the boresight sequence. Thus, after a predetermined number of laser fire command pulses are generated in the presence of the enable function represented by the autoboresight command, the flipflops 110 are set to enable coincidence gates 95A and 95B of FIGS. 5A and 5B, which gates have been illustrated in FIG. 3 as a single coincidence gate 95.

In FIG. 5B, it will be noted that the A/B clock, representing the autoboresight clock signal provided on lead 53 from the TV camera 22, is in turn applied to lead C connected to coincidence gates 95A and 95B. Thus, with regard to FIG. 5A for example, when coincidence gate 95A has been enabled, the A/B clock, which in this embodiment is a 2.016 MHz clock, is provided to coincidence gates 80 and 82. It is to be noted that the second input to gate 80 is the output from the comparator 78, whereas the second input to gate 82 is the output from this comparator when applied through inverter 84.

Depending on the state of the comparator 78 at the time the flipflop 110 is set, the A/B clock will pass either through the coincidence gate 80 or the coincidence gate 82. If the clock signal passes through gate 80, counter chain 122, 124, 126 will count up, whereas if the A/B clock passes through gate 82, this counter chain will count down.

It is to be noted that counting up or counting down changes the digital input to the D/A converter 88, which results in a commensurate change in its output, and this turn results in a voltage change in the output of amplifier 128, which serves to generate the analog value of the horizontal bias modification control signal on lead 60 in FIG. 5A. While phasing is dependent on the exact hardward implementation, in our peferred embodiment, counting up generates a greater positive voltage which, when viewing the vidicon, shifts the vidicon raster to the right, whereas counting down generates a greater negative voltage, shifting the vidicon raster to the left. Therefore counting up corrects for right shift oriented misalignment errors, and counting down corrects for left shift oriented misalignment errors with respect to the center of the operating FOV.

As is obvious, a similar explanation applies to FIG. 5B, with it to be understood that the output of amplifier 128 of this figure is the vertical bias modification control signal on lead 58.

With regard to the components in FIG. 5A corresponding to the summer 74 of FIG. 3, these involve resistors R1 and R2 and amplifier A1 in FIG. 5A, with the tracker horizontal error appearing on lead 54 being applied to R1, and the horizontal bias modification signal of lead 60 being applied to R2. The summing point is of course at the node between these resistors, and the summed signal is received at the positive input of comparator 78 in FIG. 5A via the RC filter comprised of R3 and C1.

The negative input to comparator 78 in FIG. 5A is of course the horizontal bias modification signal on lead 60, and this signal is the analog equivalent of the digital count stored in the counters 122, 124 and 126, which counters correspond to counter 86 in FIG. 3. As previously explained, the digital count is converted into an analog signal through the operation of the digital-to-analog converter 88, whose output is to the positive terminal of amplifier 128, and it is the output of latter amplifier that is provided to lead 60.

The state of comparator 78 determines, as previously mentioned, the direction the counter chain 122, 124 and 126 counts, but counting can of course only take place in the presence of the A/B clock provided, as previously explained, to the coincidence gates 80 and 82 when the flipflop 110 has been SET. If the output of comparator 78 is a logic 1, indicating that the signal from amplifier A1 at its positive terminal is greater than the signal at its negative terminal, the counter chain will count up, whereas if the output of comparator 78 is a logic zero, indicating that the signal at its negative terminal is greater, the counter chain will count down.

The autoboresight sequence may be terminated through the operation of the exclusive OR circuits 130, 132, as explained in detail hereinafter, which will produce a logic signal of proper polarity to reset the flipflop 110 when the output of comparator 78 changes state, thereby signifying that the nulling of the tracker error signal has occurred. The logic signal which rests the flipflop 110 is of a time duration equal to the propagation delay of exclusive OR circuits 130, 132 and inverter 84.

It should be noted therefore that the flipflops 110 of FIG. 5A and FIG. 5B are in each instance the critical logic control block with regard to the respective updating of the horizontal bias modification signal and the vertical bias modification signal, in that such flipflop must be placed in the SET condition in order to allow the counting chain to count up or count down to bring about an appropriate change in the bias modification signals. Likewise, when flipflop 110 is RESET, the value of the bias modification signal reaches steady state and no further shift in the vidicon raster on the basis of these signals can at this point occur. Obviously, upon initiation of a new autoboresight command, flipflop 110 will again be SET, and the above described procedure substantially repeated.

A change in the horizontal bias modification signal 60 will be terminated through the operation of the exclusive OR circuits 130, 132 which will produce a logic signal of proper polarity to RESET the flipflop 110 when the output of comparator 78 changes its output state. The logic signal which clears the flipflop 110 is a pulse whose time duration is equal to the propagation delay of exclusive OR circuits 130, 132 and inverter 84. As will be seen, flipflop 110 can only be reset by a change of state occurring at the output of comparator 78 which, when propagated through exclusive OR gates 130 and 132 inverter 84, pulls the CLEAR terminal of the flipflop 110 to a logic low, thus to accomplish reset.

There are two ways by which flipflop 110 may be RESET, and description of these two ways now follows.

When the output of comparator 78 is a logic high, which is the circumstance in which the signal from summer A1 is greater than the bias modification signal, the input 134 to exclusive OR gate 130 is also at a logic high. At this point the input 136 to gate 132 is at a logic low due to the action of inverter 84. With input 138 maintained at a logic low, the output of gate 132 is at a logic low, resulting in a logic high output from gate 130. At this point flipflop 110 remains in the previously established SET condition.

When the negative input to comparator 78 becomes greater than the value of the signal at its positive input, a logic low at the output of the comparator will result. This will bring about a logic low at the output of gate 130 for a time duration equivalent to the propagation delay of inverter 84, plus the propagation delay of exclusive OR gates 132 and 130. During this logic low, the flipflop 110 will be reset, thereby disabling coincidence gate 95A and subsequently disabling coincidence gates 80 and 82 which prevent the counters 122, 124 and 126 from counting any further.

Alternately, should the positive intput to comparator 78 be less than the value of the signal at its negative input, at the start of an A/B sequence, a logic low at the output of the comparator will exist, the output from exclusive OR gate 132 will at a logic high, resulting once again in a logic high at the output of the gate 130. As the counter chain counts down, the negative input to comparator 78 will become less than the signal at its positive input, causing comparator 78 to change states from a logic low to a logic high, which will result in a logic high at both inputs to gate 130, causing a logic low at its output. This logic low will last for a duration equal to the propagation delay of inverter 84 and exclusive OR gates 130, 132. This logic low at the clear input to flipflop 110 will again RESET the flipflop. With the flipflop 110 reset, coincidence gate 95A is disabled, disabling coincidence gates 80, 82 to prevent the counters 122, 124 and 126 from counting any further. Thus, a change of state of comparator 78 from a low to high or vice versa effects a RESET condition of flipflop 110.

It should be noted that the use of R3, C1 and Q1 is to provide a smoothing action on the output of amplifier A1 as well as a short term memory of the analog voltage we are trying to correct for during the A/B sequence. Q1 is an FET switch used to discharge C1 during the timing pulse of one shot 112 so as to eliminate any long term changes in the voltage across C1. Therefore, just prior to the portion of the autoboresight sequence, in which the horizontal bias modification signal will be changed, capacitor C1 is discharged, thereby setting the voltage across it to zero volts; at the same time that the counters 122, 124 and 126 are loaded to their pre-programmed value.

Further details of this portion of our system will be more apparent from the copending application of Thomas, Gay and Winsor entitled "Digital Voltage Accumulator," Ser. No. 867,214 filed Jan. 5, 1978.

We have thus herein provided a feedback loop between the laser source and the TV camera, in which the point tracker interconnected with the TV camera is utilized on selected occasions to sense and measure the misalignment between the output of the laser source, and the center of the operation field of view of the TV camera, with our novel error processor being used to convert error signals from the point tracker that are representative of the misalignment, into alignment modification signals directly usable in the adjusting of the TV camera so as to boresight its operating field of view with the output from the laser source.

Automatic boresighting of the laser beam in an aircraft-mounted laser designator pod to the video sensor of its automatic television tracker system may thus be accomplished in accordance with this invention by retroreflecting the laser beam back through the imaging optics to form a spot on the sensor faceplate. The retroreflector causes the spot to appear on the sensor faceplace at the exact location in the field defined by the emitted laser beam, and defocusing of the retroreflected laser spot may be performed to permit the existing point tracker to readily lock onto the spot.

The video sensor, which may be a standard vidicon with sensitivity at the laser spectral frequency, is interfaced by way of the TV camera to the television point tracker which operates to produce error signals representing the misalignment between the center of the operational FOV or null point, and the point in the field defining the target, which, during boresighting operations, is of course the retroreflected laser spot. When the tracker locks onto the laser spot, it generates error signals representing the boresight error. As should now be clear, these error signals, after processing in the novel autoboresight error signal processor, are supplied as vertical and horizontal bias modification signals to the vidicon bias circuitry to cause the raster to move until the tracker error signals are nulled. The bias signals thus generated are stored as a digital word in the autoboresight error processor until the next boresighting sequence is initiated.

We claim:

1. In a laser designator system including a laser source, an imaging subsystem utilizing a sensor having a raster and a photosensitive surface, a tracker connected to receive video information from said sensor and serving to generate error signals, and optical components defining at least one optical path, said designator system including an arrangement of certain of said optical components that serve to direct an output beam of energy from said laser source through an outlet port, certain other of said components serving to direct scene radiance entering through the outlet port, such that a portion of the incoming radiance falls upon the photosensitive surface of said sensor, and means for controlling one of said components so as to interrupt for a short time duration, the entering scene radiance and the laser energy passing outwardly through said outlet port, and to redirect the laser energy along an optical path such that a part of such energy falls upon the photosensitive surface of said sensor, means sensitive to any misalignment of said sensor with respect to said laser and serving to create bias modification signals for delivery to said sensor, to modify the sweep circuits of said sensor in such a way as to null the error signals and thereby bring the center of the raster into coincidence with the laser output beam.

2. The laser designator system as defined in claim 1 wherein said tracker is a TV point tracker.

3. The laser designator system as defined in claim 1 wherein said sensor is a vidicon.

4. The laser designator system as defined in claim 1 wherein said sensor is a FLIR.

5. The laser designator system as defined in claim 2 wherein said means sensitive to a misalignment of said sensor is an error signal processor for processing error signals from the TV point tracker to adjust the sweep circuits of said sensor in order to achieve alignment coincidence with the laser.

6. The laser designator system as defined in claim 5 in which said error signal processor means includes:
   (a) means for storing a video sensor raster bais modification signal,
   (b) means for summing said stored bias modification signal with a tracker error signal,
   (c) means for comparing said summation signal with said stored bias modification signal, and
   (d) means for altering said stored bias modification signal in response to the signal produced by said means for comparing.

7. In a laser designator system, including a laser source, a video sensor and a television tracker, a method for boresighting the laser beam comprising the steps of:
   (a) retroflecting said laser beam to the faceplate of the video sensor,
   (b) causing the television tracker to produce error signals representative of the misalignment between the retroflected laser beam and the tracker null point, and
   (c) automatically controlling the raster bias of said video sensor to null the television tracker error signals.

8. The method of claim 7 wherein the steps of automatically controlling the raster bias includes the steps of:
   (a) summing the tracker error signals with raster bias modification signals, comparing said summed signals with said raster bias modification signals, and increasing or decreasing said raster bias signals when a difference appears between the said summed signals and said raster bias modification signals to achieve coincidence,
   (b) storing said raster bias modification signals, and
   (c) combining the raster bias modification signals with the video sensor produced raster sweep signals.

9. In a laser designator system, including a laser source, video sensor and television trcker, apparatus for boresighting the laser beam comprising:
   (a) optical means normally directing the laser beam through an output port, but selectively operable to retroreflect the laser beam onto the sensitive surface of said video sensor,
   (b) means for causing the television tracker to produce error signals representative of the misalignment between the retroflected laser beam and the tracker null point, and
   (c) means responsive to the tracker error signals for automatically adjusting the video sensor vertical and horizontal raster bias to null the tracker error signals.

10. The appratus of claim 9 wherein said television tracker is a point tracker, and further including means for defocusing the retroflected laser beam to permit the tracker to lock on the laser beam.

11. The apparatus of claim 9 wherein said means for automatically adjusting said video sensor bias comprises an error signal processor means, for generating vertical and horizontal raster bias modification signals, said error signal procesor means including:
   (a) means for storing a video sensor raster bias modification signal
   (b) means for summing said stored bias modification signal with a tracker error signal,
   (c) means for comparing said summation signal with said stored bias modification signal, and
   (d) means for altering said stored bias modification signal in response to the signal produced by said means for comparing.

12. In a laser designator system including a laser source, an imaging subsystem utilizing a sensor having a raster and a photosensitive surface, a tracker connected to receive information from said sensor and serving to generate error signals, and optical components for directing an output beam of energy from said laser source through an outlet port and for directing scene radiance entering through the outlet port to said photosensitive surface of said sensor, means for redirecting the output beam of energy from said laser source such that at least a portion of said energy falls upon the photosensitive surface of said sensor, means responsive to any misalignment of said sensor relative to said laser beam for generating signals indicative of said misalignment, and means responsive to said signals indicating misalignment for causing the center of the sensor raster to coincide with the laser output beam.

13. The laser designator system of claim 12 wherein said means responsive to any misalignment is an error signal processor for processing error signals from said tracker representative of said misalignment and for generating said processed error signals, said adjustment means operating in response to said processed error signals for causing the center of the sensor raster to coincide with the laser output beam to null the tracker error signals.

14. The laser designator system of claim 13 wherein said adjustment means includes means for modifying the sensor raster bias signals in accordance with said processed error signals in a manner to bring the center of said raster into coincidence with the laser output beam.

15. The laser designator of claim 13 wherein said adjustment means includes means for physically altering the position of said sensor relative to said laser beam to bring the center of said sensor raster into coincidence with said laser beam.

16. In a laser designator system including a laser source, an imaging subsystem utilizing a sensor having a raster and a photosensitive surface, a tracker connected to receive information from said sensor and serving to generate error signals, and optical components for directing an output beam of energy from said laser source through an outlet port and for directing scene radiance entering through the outlet port to said photosensitive surface of said sensor, a method for boresighting said output laser beam to the sensor comprising the steps of:
- redirecting at least a portion of said output laser beam to the photosensitive surface of said sensor,
- causing said tracker to produce error signals representative of the misalignment between the laser beam and the sensor, and
- automatically causing a positioning adjustment to null the tracker error signals.

17. The method of claim 16 wherein said step of automatically causing a positioning adjustment involves automatically controlling the raster bias of said sensor to bring the center of said raster into coincidence with said output laser beam.

18. The method of claim 16 wherein said step of automatically causing a positioning adjustment involves physically altering the sensor position to bring the output laser beam into coincidence with the center of the raster of said sensor.

* * * * *